United States Patent
Priepke

(10) Patent No.: US 8,616,364 B2
(45) Date of Patent: Dec. 31, 2013

(54) HARVESTER CROP DELIVERY SYSTEM

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 153 days.

(21) Appl. No.: 13/270,283

(22) Filed: Oct. 11, 2011

(65) Prior Publication Data

US 2013/0087432 A1    Apr. 11, 2013

(51) Int. Cl.
    *B65G 19/14*    (2006.01)
(52) U.S. Cl.
    USPC ............ 198/716; 198/818; 198/842; 198/540
(58) Field of Classification Search
    USPC ................. 198/540, 544, 716, 818, 837, 842, 198/861.2
    See application file for complete search history.

(56) References Cited

U.S. PATENT DOCUMENTS

| | | |
|---|---|---|
| 2,147,908 A | 2/1939 | Medeira |
| 2,925,053 A | 2/1960 | Beaman |
| 3,828,916 A | 8/1974 | Patz |
| 4,270,881 A | 6/1981 | Baker et al. |
| 4,760,913 A * | 8/1988 | Tschantz ...................... 198/819 |
| 4,775,047 A | 10/1988 | Grall |
| 5,052,545 A * | 10/1991 | Gongen ......................... 198/534 |
| 5,246,102 A | 9/1993 | Rappen et al. |
| 5,857,907 A | 1/1999 | Underwood |
| 5,865,675 A | 2/1999 | Meester |
| 7,452,180 B2 | 11/2008 | Talbi et al. |
| 7,862,286 B2 | 1/2011 | Mackin et al. |
| 7,867,071 B1 * | 1/2011 | Ricketts et al. ................. 460/23 |
| 8,147,176 B2 | 4/2012 | Coers et al. |
| 8,241,098 B1 | 8/2012 | Latimer |

FOREIGN PATENT DOCUMENTS

EP    315820 A1 *   5/1989

* cited by examiner

*Primary Examiner* — Leslie A Nicholson, III
(74) *Attorney, Agent, or Firm* — Patrick M. Sheldrake

(57) ABSTRACT

A crop delivery system for a harvester including a vessel positioned in a harvester for securing a crop therein. A first tube has a first angled orientation and configured to receive the crop from the vessel. A second tube has a second angled orientation. A transition area is positioned between the first tube and the second tube. A continuous belt extends from the first tube to the second tube. A portion of the belt carrying the crop between the first tube and the second tube is structurally supported and substantially covered by the first tube, the second tube and the transition area. The transition area includes a roller positioned substantially transverse to the first tube and the second tube and in contact with the belt, the roller forming a substantially flat bend area in the belt for transitioning the belt from the first angled orientation to the second angled orientation.

20 Claims, 2 Drawing Sheets

HARVESTER CROP DELIVERY SYSTEM

FIELD OF THE INVENTION

The present invention generally relates to agricultural harvesting equipment and, more particularly, to a crop delivery system for agricultural harvesting equipment, such as a combine.

BACKGROUND OF THE INVENTION

Grain tanks of combines commonly have an associated unloader conveyor operable for conveying grain from the grain tank to another location such as to a grain truck or wagon. An unloader conveyor typically includes an elongate, enclosed tubular housing containing a helical auger and is oriented horizontally or at a small acute angle to horizontal. The unloader conveyor is typically pivotally supported in cantilever relation by a lower end of an upstanding or vertical lower unloader conveyor section including an inlet opening disposed in or adjacent to the grain tank. The unloader conveyor is typically pivotable between a stored position extending along the combine, and a sidewardly extending unloading position. The unloader can be of any length, but will typically have a length sufficient to extend just beyond the end of a header of the combine. Grain tanks additionally typically include at least one grain tank conveyor including an auger adjacent to the bottom of the grain tank and extending into the inlet opening of the lower unloader conveyor for conveying grain into the unloader.

Conventional unloader conveyor housings typically extend linearly from the combine, providing little clearance between the unloader conveyor and the grain truck or wagon, increasing the opportunity for contact and damage to the unloader conveyor. Additionally, use of an auger associated with an unloader conveyor often results in both vibration during operation of the unloader conveyor, as well as sliding and mixing of the crop or grain along the auger surface, possibly resulting in damage to the crop or grain and requiring increased power to convey the crop or grain along the unloader conveyor.

Thus, there is a need and a desire for a crop delivery system that provides additional clearance between the harvester and to the receiving crop or grain truck or wagon, while reducing vibration and the opportunity for crop or grain damage during delivery thereof.

SUMMARY OF THE INVENTION

Other features and advantages of the present invention will be apparent from the following more detailed description of an exemplary embodiment, taken in conjunction with the accompanying drawings which illustrate, by way of example, the principles of the invention.

The present invention relates to a crop delivery system for a harvester including a vessel positioned in a harvester for securing a crop therein. A first tube has a first angled orientation, a first end and an opposed second end. The first tube is connected to the harvester and configured to receive the crop from the vessel at the first end. A second tube has a second angled orientation, a third end, and an opposed fourth end. The second end of the first tube and the third end of the second tube are connected by a transition area. The crop received from the first end of the first tube is to be delivered to the fourth end of the second tube. A continuous belt has a receiving region in close proximity to the first end of the first tube and a delivery region in close proximity of the fourth end of the second tube. A portion of the belt carrying the crop between the first end of the first tube and the fourth end of the second tube is structurally supported by and substantially covered by the first tube, the second tube and the transition area. The transition area includes a roller positioned substantially transverse to the first tube and the second tube and in contact with the belt. The roller forms a substantially flat bend area in the belt for transitioning the belt from the first angled orientation to the second angled orientation.

The present invention further relates to a harvester including a frame and a vessel supported by the frame. The vessel is positioned in a harvester for securing a crop therein. A first tube has a first angled orientation, a first end and an opposed second end. The first tube is secured to the harvester and configured to receive the crop from the vessel at the first end. A second tube has a second angled orientation, a third end, and an opposed fourth end. The second end of the first tube and the third end of the second tube is connected by a transition area. The second tube is configured to deliver the crop received from the first tube at the fourth end. A continuous belt has a receiving region in close proximity to the first end of the first tube and a delivery region in close proximity of the fourth end of the second tube. A portion of the belt carrying the crop between the first end of the first tube and the fourth end of the second tube is structurally supported by and substantially covered by the first tube, the second tube and the transition area. The transition area includes a roller positioned substantially transverse to the first tube and the second tube and in contact with the belt. The roller forms a substantially flat bend area in the belt for transitioning the belt from the first angled orientation to the second angled orientation.

Numerous other features and advantages of the present invention will become readily apparent from the following detailed description, the accompanying drawings, and the appended claims.

Figure 1:
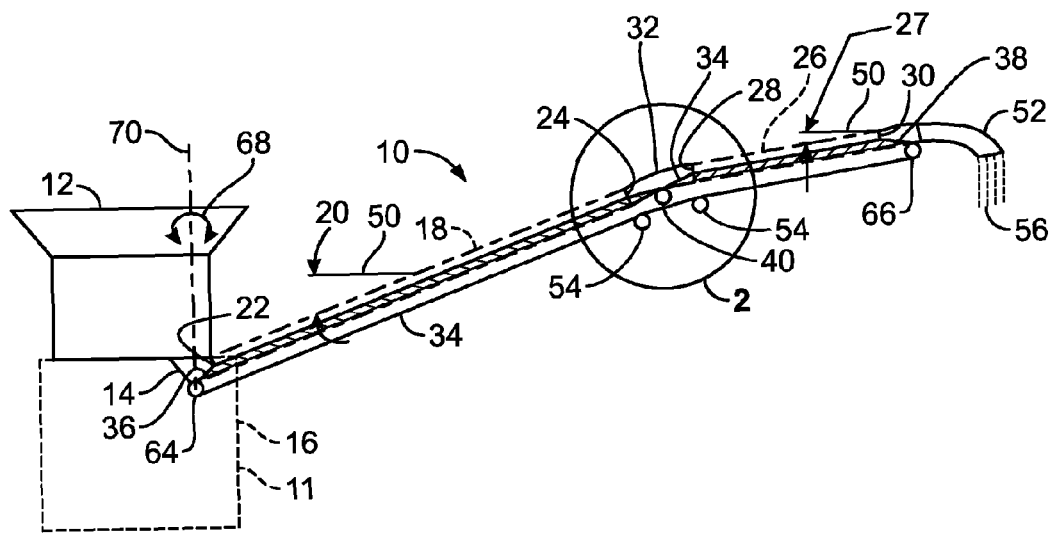
FIG. 1 is a partial elevation view of a crop delivery system of a work vehicle of the present invention.

Numerous other features and advantages of the present invention will become readily apparent from the following detailed description, the accompanying drawings, and the appended claims.

DETAILED DESCRIPTION OF THE INVENTION

While the present invention is susceptible of embodiment in various forms, there is shown in the drawings and will hereinafter be described a preferred embodiment of the present invention with the understanding that the present disclosure is to be considered as an exemplification of the invention that is not intended to limit the invention to the specific embodiment illustrated.

Referring now to the drawings, an exemplary embodiment of a crop delivery system 10 of the present disclosure is shown in FIG. 1. Crop delivery system 10 is configured to receive a harvested crop, such as a grain from a lower portion 14 of a vessel 12, also referred to as a grain bin. Grain bin or vessel 12, is supported by a frame 16 of a self-propelled agricultural combine 11, such as disclosed in Applicant's U.S. Pat. No.

7,452,180 titled Grain Tank Unloader And Clean Out Control, which is incorporated by reference herein in its entirety.

As further shown in FIGS. 1-4, crop delivery system 10 includes a first tube 18 having a first end 22 and a second end 24. First tube 18 is connected to a harvester 11, such as an agricultural combine, such as a pivotable connection permitting rotational movement 68 about an axis 70 either toward or away from harvester 11 in a well-known manner. First tube 18 has a first angled orientation 20, such as with respect to a horizontal plane 50. First angled orientation 20 can be up to about 30 degrees from horizontal plane 50, such as an angled orientation that is directed upwardly, since an upwardly directed angle exceeding about 30 degrees typically results in the crop tumbling downwardly along first tube 18, i.e., in a direction opposite to that desired. Crop delivery system 10 includes a second tube 26 having a third end 28 and a fourth end 30, with second tube 26 positioned at a second angled orientation 27. In an exemplary embodiment, second angled orientation 27 can be up to about 10 degrees from a horizontal plane 50. In another embodiment, second angled orientation 27 can be greater than 10 degrees. As shown, in close proximity to fourth end 30 of second tube 26, a spout 52 may be positioned to help direct harvested crops 56 downwardly into a collection device (not shown).

A transition area 32 is positioned between second end 24 of first tube 18 and third end 28 of second tube 26 in order to transition between the corresponding angled orientations of a belt 34, as the belt is urged into driven movement from first tube 18 to second tube 26. A flexible, continuous belt 34 has a receiving region 36 that is in close proximity to first end 22 of first tube 18, which belt 34 extending to a delivery region 38 in close proximity of fourth end 30 of second tube 26. Receiving region 36 of belt 34 receives a harvested crop, such as a grain, from a lower portion 14 of a vessel 12 of harvester 11, with the harvested crop received from first end 22 of first tube 18 to be delivered through transition area 32 to the fourth end 30 of second tube 26. Belt 34 is urged into driven movement such as by a motor (not shown) or other known arrangement between a primary roller 64 positioned in close proximity to first end 22 of first tube 18 and a primary roller 66 positioned in close proximity to fourth end 30 of second tube 26.

Figure 3:
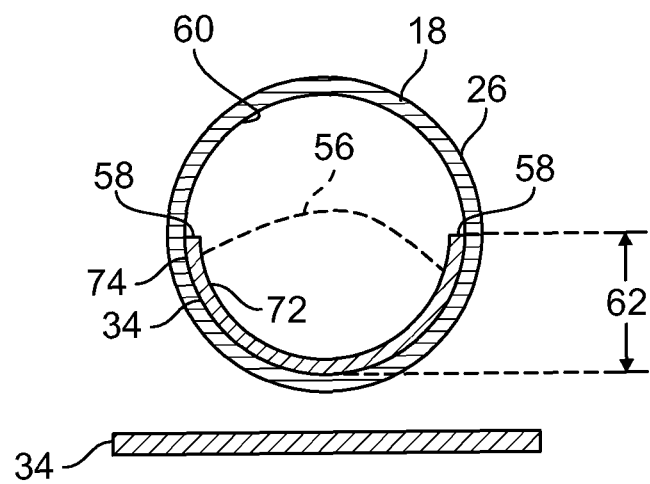
FIG. 3 is a cross section taken along line 3-3 from FIG. 2 of the present invention.
Figure 4:
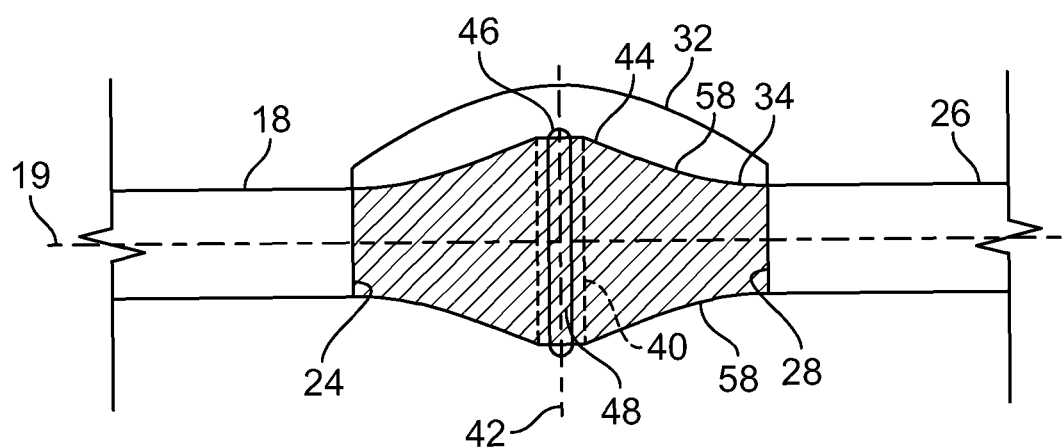
FIG. 4 is a view taken along lines 4-4 from FIG. 3 of the present invention.

As shown in FIGS. 3-4, belt 34 is structurally supported (i.e., slidably supported or carried) along respective inside surfaces 60 of first tube 18 and second tube 26. In an exemplary embodiment, tubes 18, 26 are substantially cylindrical, although in other embodiments, the tubes may define a different profile. Although first tube 18 is shown having a length and a first angled orientation 20 greater than the length of second tube 26 and of a second angled orientation 27, the present disclosure is not so limited, so long as crops are delivered from the vessel of the harvester to the intended collection machinery or device. As further shown in FIG. 3, a majority of surface 72 of belt 34 positioned between opposed edges or ends 58 of belt 34 is in contact with a crop 56 as the crop is carried through the tubes 18, 26. Surface 74 of belt 34 between opposed ends 58 of the belt, which surface 74 of the belt is opposite of surface 72, is slidably supported or carried along respective inner surfaces 60 of first tube 18, second tube 26. Stated another way, surface 74 of belt 34 between opposed ends 58 of the belt extends along a slidable contact region 62. In one embodiment, the coefficient of friction between surface 74 and the inner surfaces 60 of the tubes is less than the coefficient of friction between surface 72 and the crop. In another embodiment, slidable contact region 62 that is formed between surface 74 of belt 34 and respective inner surfaces 60 of first tube 18 and second tube 26, contacts up to about one half of the inner surfaces 60 of the tubes 18, 26. For example, if the inside diameter of tubes 18, 26 are 10 inches, belt 34 would measure approximately 15 inches between opposed ends 58. Similarly, if the inside diameter of tubes 18, 26 are 12 inches, belt 34 would measure approximately 18 inches between opposed ends 58. In one embodiment, first tube 18 and second tube 26 are sized to be substantially similar. However in another embodiment, first tube 18 second tube 26 may be sized differently from each other.

Figure 2:
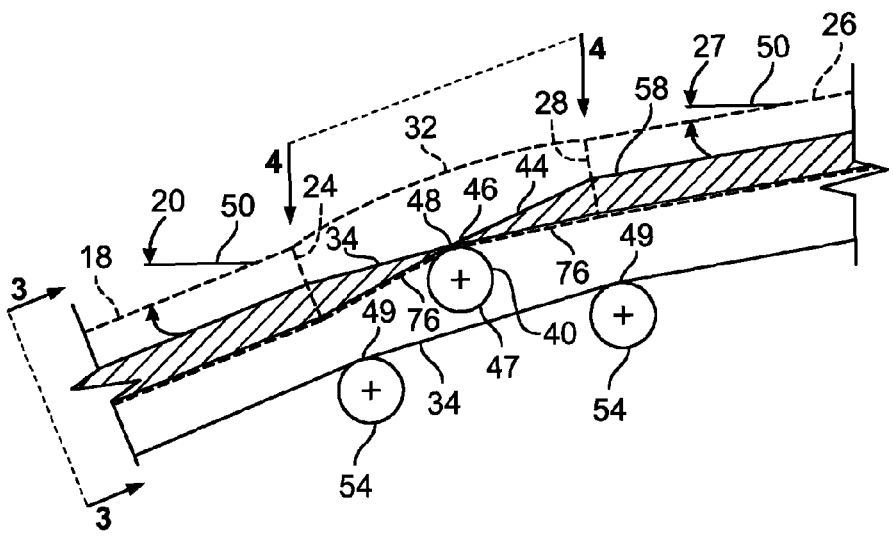
FIG. 2 is a view taken along region 2 from FIG. 1 of the present invention.

As further shown in FIGS. 2-4, transition area 32 is positioned between second end 24 of first tube 18 and third end 28 of second tube 20. Transition area 32 includes a supporting region 76 having a gradual profile change that is positioned beneath belt 34. To assist with understanding of the disclosure, the width of belt 34 (the distance between opposed ends 58) is substantially the same along the longitudinal length of belt 34. It is apparent to one having ordinary skill in the art that the increased spacing between opposed ends 58 of belt 34 in transition area 32, as shown in FIG. 4, is due to the gradual changing of the profile of supporting region 76 (FIG. 3). That is, as shown in FIG. 4, proceeding in a direction along axis 19 from second end 24 of first tube 18 toward a surface 47 of a substantially cylindrical roller 40 having a substantially transverse axis 42, the shape or profile defined by a plane parallel to transverse axis 42 and perpendicular to longitudinal axis 19 of first tube 18 cutting through supporting region 76 defines an increasingly flattening surface supporting belt 34. This change in profile is evidenced, and shown in FIG. 4, by the apparent increase in width between ends 58 of belt 34, which belt having a substantially constant width, with the apparent increase in belt width identified as a transition profile 44 of belt 34. In other words, as belt 34 proceeds along axis 19 toward surface 47 of substantially cylindrical roller 40 having substantially transverse axis 42, supporting region 76 gradually transitions from a substantially circular cross section (similar to FIG. 4), such as at second end 24 of first tube 18, to a substantially flat bend area 48 along surface 47 of substantially cylindrical roller 40 having substantially transverse axis 42. Substantially cylindrical surface 47 of substantially transverse axis 42 extends through a slot 46 formed through supporting surface 76 of transition area 32, forming substantially flat bend area 48 in belt 34. Substantially flat bend area 48 forms the basis for the transition of belt 34 between first angled orientation 20 and second angular orientation 27. For similar reasons discussed above, the profile of a portion of supporting surface 76 extending from third end 28 of second tube 26 toward surface 47 of substantially cylindrical roller 40 having substantially transverse axis 42 is virtually identical to the profile of another portion of supporting surface extending from second end 24 of first tube 18 toward surface 47 of substantially cylindrical roller 40 having substantially transverse axis 42. In another embodiment, the profile a portion of supporting surface 76 extending from third end 28 of second tube 26 toward surface 47 of substantially cylindrical roller 40 having substantially transverse axis 42 may be different from the profile of another portion of supporting surface extending from second end 24 of first tube 18 toward surface 47 of substantially cylindrical roller 40 having substantially transverse axis 42.

Once belt 34 has dispensed crop material from delivery region 38 in close proximity to fourth end 30 of second tube 26, the belt passes beneath the tubes 18, 26 toward receiving region 36 in close proximity to first end 22 of first tube 18. As shown in FIGS. 1-2, secondary rollers 54 located beneath transition area 32 maintain proper tensioning in the belt by establishing substantially flat bend areas 49 due to contact between rollers 54 and bend areas 49, as well as limiting downward deflection of the portion of the belt positioned beneath the tubes and extending between delivery region 38 in close proximity to fourth end 30 of second tube 26 and first end 22 of first tube 18. In another embodiment, rollers 54 may be positioned beneath one or more of first tube 18, second tube 26 and/or transition area 32.

By virtue of substantially flat bend area 48 in transition area 32, the change in angled orientations 20, 27 defined by respective tubes 18, 26 provides multiple benefits. First, by permitting the lowering of receiving region 36 of belt 34 sufficiently beneath lower portion 14 of vessel 12 of harvester 11, an "in tank elevator" or vertical conveying equipment, typically involving augers, as well as the associated drive units, can be removed, reducing costs associated with these components, and increasing the usable volume of the vessel, due to the removal of such vertical conveying equipment. Second, grain damage is lessened by use of a continuous belt, compared to conventional auger grain conveying systems. Third, operation of a continuous belt provides a significant reduction in vibration over conventional augered conveying systems, resulting in noise reduction, as well as extended service life of associated components. Fourth, by virtue of the significant differences that may be used between angular orientations associated with respective tubes, crops can be effectively raised, by utilizing an increased first angled orientation 20 associated with a first tube, from a lower initial position of the harvester (i.e., from beneath lower portion 14 of vessel 12, versus an upper portion of the vessel in conventional harvester constructions) to provide sufficient vertical clearance of crop collection machinery, such as wagons or trucks, with a differing (and typically reduced) second angular orientation 27 of the second tube 26, reducing the opportunity of damage between the crop collection machinery and the harvester.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A crop delivery system for a harvester, comprising:
a vessel positioned in a harvester for securing a crop therein;
a first tube having a first angled orientation, a first end and an opposed second end, the first tube connected to the harvester and configured to receive the crop from the vessel at the first end;
a second tube having a second angled orientation, a third end, and an opposed fourth end, the second end of the first tube and the third end of the second tube connected by a transition area, the crop received from the first end of the first tube to be delivered to the fourth end of the second tube;
a continuous belt having a receiving region in close proximity to the first end of the first tube and a delivery region in close proximity of the fourth end of the second tube, a portion of the belt carrying the crop between the first end of the first tube and the fourth end of the second tube being structurally supported by and substantially covered by the first tube, the second tube and the transition area; and
wherein the transition area includes a roller positioned substantially transverse to the first tube and the second tube and in contact with the belt, the roller forming a substantially flat bend area in the belt for transitioning the belt from the first angled orientation to the second angled orientation.

2. The system of claim 1, wherein the first tube is pivotably connected to the harvester.

3. The system of claim 1, wherein the first tube is up to about 30 degrees from a horizontal plane.

4. The system of claim 1, wherein the second tube is up to about 10 degrees from a horizontal plane.

5. The system of claim 1, wherein the transition area includes a slot to receive the roller therethrough from beneath the transition area.

6. The system of claim 1, wherein a spout is positioned at the fourth end of the second tube.

7. The system of claim 1, wherein the crop is removed from a lower portion of the vessel.

8. The system of claim 1, wherein the harvester is an agricultural combine.

9. The system of claim 1, wherein the first tube and the second tube are substantially cylindrical.

10. The system of claim 9, wherein the belt extends transversely between the first end of the first tube and the fourth end of the second tube, the belt in slidable contact with up to about one half of the inner surface of the first tube and the second tube.

11. The system of claim 1, wherein at least one secondary roller is positioned transversely with respect to the first tube and the second tube beneath the transition area.

12. The system of claim 11, wherein the belt forming a substantially flat profile when contacting the at least one secondary roller.

13. The system of claim 1, wherein a primary roller is transversely positioned in close proximity to the first end of the first tube and to the fourth end of the second tube.

14. The system of claim 13, wherein the belt forming a substantially flat profile and contacting the primary roller.

15. The system of claim 1, wherein at least one secondary roller is positioned transversely with respect to the first tube and the second tube beneath the transition area.

16. A harvester comprising:
a frame;
a vessel supported by the frame, the vessel positioned in a harvester for securing a crop therein;
a first tube having a first angled orientation, a first end and an opposed second end, the first tube secured to the harvester and configured to receive the crop from the vessel at the first end;
a second tube having a second angled orientation, a third end, and an opposed fourth end, the second end of the first tube and the third end of the second tube connected by a transition area, the second tube configured to deliver the crop received from the first tube at the fourth end;
a continuous belt having a receiving region in close proximity to the first end of the first tube and a delivery region in close proximity of the fourth end of the second tube, a portion of the belt carrying the crop between the first end of the first tube and the fourth end of the second tube being structurally supported by and substantially covered by the first tube, the second tube and the transition area;

wherein the transition area includes a roller positioned substantially transverse to the first tube and the second tube and in contact with the belt, the roller forming a substantially flat bend area in the belt for transitioning the belt from the first angled orientation to the second angled orientation.

17. The harvester of claim 16, wherein the transition area includes a slot to receive the roller therethrough from beneath the transition area.

18. The harvester of claim 16, wherein the crop is removed from a lower portion of the vessel.

19. The harvester of claim 16, wherein the harvester is an agricultural combine.

20. The system of claim 16, wherein the belt extends transversely between the first end of the first tube and the fourth end of the second tube, the belt in slidable contact with up to about one half of the inner surface of the first tube and the second tube.

* * * * *